Patented Oct. 4, 1927.

1,644,115

UNITED STATES PATENT OFFICE.

ALFRED EGGIMANN AND ALBINO PEREA, OF PARIS, FRANCE.

METHOD OF MANUFACTURING TRANSLUCENT ARTICLE.

No Drawing. Application filed May 17, 1924, Serial No. 714,127, and in France June 12, 1923.

This invention relates to a new industrial product, which is solid and translucent and has a base of gelatine and zinc white.

It is adapted to replace glass, for a great number of purposes, in particular in connection with illumination.

The product may be coloured uniformly throughout its mass with a single tint or it may be provided with veins and it then has the appearance of alabaster. It may be varnished on the surface.

As this new product can be given any required shape, its applications are numerous. It may be utilized more particularly for the manufacture of shades, cups, saucers, basins etc. The new product is noninflammable, unbreakable and translucent.

In manufacturing the product, according to the invention in the first place a solution is prepared having the following compositions:—

2,500 grammes of water, 500 grammes of special gelatine, 250 grammes of zinc white.

These ingredients are mixed together in a receptacle which is by preference formed as a sand stone basin. The operation is conducted under heat in a water tray or bath, at a temperature of about 45° C. The mass is continually agitated, this agitation being effected by means of a wooden rod until all the ingredients are fused and the solution takes the form of a homogeneous mass of slightly viscous nature.

This solution is then poured into another receptacle or stone basin, being filtered through a very fine gauze sieve so as to remove impurities and lumps which may be contained in the primary solution. In this way the constitutional substance or material of the new product is produced.

In order to manufacture an article therefrom a mould is provided having, on the outside, the shape of the said article. The mould is preferably of metal and may for instance be made of aluminium. It is dipped into the solution which has been prepared so that the whole outer surface is submerged. It is then removed from the bath and owing to the viscosity of the solution it adheres and covers the surface of the mould to a certain thickness.

When the mould is removed from the bath, the excess of solution is allowed to drain away for a short time and then the mould is so manipulated that the layer which adheres thereto spreads in a homogeneous manner over the whole surface of the mould. It is then allowed to cool, and the solution solidifies the article thus manufactured remaining upon the mould. It is afterwards allowed to dry for a day.

After the drying is finished, the colouring of the article is proceeded with, so as to give it either a uniform surface or to form veins where it is desired that it shall have the appearance of alabaster.

With this object in view, there is first prepared in a suitable receptacle a solution constituted as follows:—

2,500 grammes of water, 500 grammes of pure gelatine.

In order to melt the gelatine the operation is carried out in the water bath at a temperature of 45° C. whilst continuously stirring. The solution obtained is filtered through a very fine gauze, which removes impurities and lumps.

To provide veins of a certain colour upon the article or veins of various colours, pure gelatine is first dropped in various places over the surface of the solution together with some drops of aniline colours. Then the mould carrying the article which is dry, as manufactured by the first process is taken and dipped sharply into the gelatine solution and zince white. It is withdrawn and immediately dipped into pure gelatine solution having on its surface the drops of aniline colour. The colours penetrate into the mass of the article in the form of veins, the shapes of which are evidently absolutely arbitrary, depending upon the distribution of the drops of colouring matter over the surface of the gelatine coating.

The article is then dried at a temperature of 20° C. and when perfectly dry it is removed from the mould.

After it is absolutely dry the object can be easily removed from the mould.

It may some times happen that the article extends to a considerable depth over the mould and there may be difficulty in detaching it therefrom. In order to provide against this there may be a small hole formed to allow the air to penetrate between the article and the mould. This makes the removal of the article very easy. The small hole in the article is afterwards filled or plugged with a small quantity of the viscous material with the base of gelatine and zinc white.

The surface of the object after colouring is matt. To render it polished the article may be given the following supplementary treatment. It is replaced on the mould and is dipped briskly into a bath formed from 2% of collodion. On removal from this bath it is allowed to dry for a suitable time (about 2 hours) and the drying being complete, the article is dipped briskly into a starchy or amylaceous solution, and after being removed is allowed to drain and then dried for a day. After this, it is removed from the mould and is finished.

The article obtained by following out the various operations just indicated has a brilliant surface and is coloured throughout its mass with veins.

If the article is to be given a uniform tint, the colouring, in place of being carried out in the manner above described is carried out in the following manner:—

The colouring material in place of being distributed in drops over the surface of the pure gelatine bath is utilized for colouring the bath completely, the colour being mixed therewith. The object is dipped into this coloured bath after the previous processes in the dry state.

If, in addition to the uniform colouring of the base it is desired to produce the effect of veins, the process just described is carried through in a first receptacle containing the bath of pure gelatine uniformly covered: and then after drying the vanes are produced by dipping the object into another bath of pure gelatine upon the surface of which drops of aniline colour of the desired shade have been distributed. The treatment with collodion and starch solution or amylaceous varnish is then carried through as previously indicated.

When the objects to be manufactured are not plain as is the case for instance with shades, globes or cups, it may be desirable to add resisting power in connection with the edges of the said articles, so as to avoid their deterioration.

With this object in view, the edge may be furnished after the article is manufactured, with a metallic ring clipped over it or fixed in any suitable manner. The edge of the object may similarly in some cases be reinforced during manufacture by means of a cotton ribbon.

The process is as follows:—

Immediately after having dipped the metallic mould into the solution of gelatine and zinc white a ribbon is attached round the bottom of the mould and the operation is then continued through the stages which have already been indicated. The dipping into the successive baths produces a contraction, and the ribbon is covered in and becomes incorporated in the article.

What we claim as our invention and desire to secure by Letters Patent of America is:—

1. A process for manufacturing an article of translucent material consisting in preparing a solution containing approximately 2,500 grammes of water, 500 grammes of gelatine and 250 grammes of zinc white, raising the solution to about 45° centigrade whilst continually stirring, providing a mould of suitable metal formed on the outside to the shape of the article to be manufactured, dipping the same into the solution, and then drying the article and removing it from the mould, substantially as described.

2. A process for manufacturing an article of translucent material consisting in preparing a solution containing approximately 2,500 grammes of water, 500 grammes of gelatine and 250 grammes of zinc white, raising the solution to about 45° centrigrade, whilst continually stirring, providing a mound of suitable metal formed on the outside to the shape of the article to be manufactured and dipping the same into the solution, preparing another solution of gelatine coloured in bulk to any required shade, dipping the article into the said solution immediately after removing it from the solution of gelatine and zince white, and then drying the article and removing it from the mould, substantially as described.

3. A process for manufacturing articles of translucent material having veins of colour which comprises preparing a solution containing approximately 2,500 grammes of water, 500 grammes of gelatine and 250 grammes of zinc white, raising the solution to about 45° centigrade, whilst continually stirring, providing a mould of suitable metal formed on the outside to the shape of the article to be manufactured and dipping the same into the solution as often as may be desired, drying the article, preparing another solution of gelatine, over the surface of which drops of colouring matter have been distributed, dipping the articles into the said solution, and then drying it and removing it from the mould, substantially as described.

4. A process for manufacturing an article of translucent material consisting in preparing a solution containing approximately 2,500 grammes of water, 500 grammes of gelatine and 250 grammes of zinc white, raising the solution to about 45° C., whilst continually stirring, providing a mould of suitable metal formed on the outside to the shape of the article to be manufactured and dipping the same into the solution and then drying the article, preparing another bath formed from a two per cent solution of collodion in a suitable solvent, dipping the article briskly into the said bath and then allowing it to dry, and finally dipping the article briskly into a starch solution and allowing it to drain and dry, substantially as described.

5. A process for manufacturing an article of translucent material consisting in preparing a solution containing approximately 2,500 grammes of water, 500 grammes of gelatine and 250 grammes of zinc white, raising the solution to about 45°, whilst continually stirring, providing a mould of suitable metal formed on the outside to the shape of the article to be manufactured and dipping the same into the solution and then drying the article, preparing another bath formed from a 2% solution of collodion in a suitable solvent, dipping the article briskly into the said bath and then allowing it to dry, and finally dipping the article briskly into a starch solution and allowing it to drain and dry, substantially as described.

In witness whereof we affix signatures.

ALFRED EGGIMANN.
ALBINO PEREA.